(12) United States Patent  
Belcher et al.

(10) Patent No.: US 8,448,972 B1
(45) Date of Patent: May 28, 2013

(54) TOWING DEVICE FOR AN ALL-TERRAIN VEHICLE

(76) Inventors: David P. Belcher, Park City, UT (US); Paul Belcher, Park City, UT (US)

(*) Notice: Subject to any disclaimer, the term of this patent is extended or adjusted under 35 U.S.C. 154(b) by 479 days.

(21) Appl. No.: 12/775,453

(22) Filed: May 6, 2010

(51) Int. Cl.
*B60P 1/28* (2006.01)

(52) U.S. Cl.
USPC ........ 280/402; 280/401; 280/415.1; 280/462; 414/428; 414/430; 414/537

(58) Field of Classification Search
USPC ............... 280/402, 656, 490.1, 43.16, 43.17, 280/43.18, 43.19, 43.22; 414/476, 482, 483, 414/484, 485, 430, 563, 786, 537, 474, 475
See application file for complete search history.

(56) References Cited

U.S. PATENT DOCUMENTS

| | | | |
|---|---|---|---|
| 2,943,863 A | 7/1960 | Corey et al. | |
| 4,784,402 A | 11/1988 | Roman | |
| 4,822,069 A | 4/1989 | Burgess | |
| 4,904,146 A * | 2/1990 | Lock et al. | 414/563 |
| 4,976,449 A | 12/1990 | Lotspeich et al. | |
| 5,090,718 A * | 2/1992 | Kauffman | 280/402 |
| D349,993 S | 8/1994 | Brand et al. | |
| D376,564 S | 12/1996 | Mishoe | |
| 5,727,920 A * | 3/1998 | Hull et al. | 414/476 |
| 5,906,386 A | 5/1999 | Baker et al. | |
| 6,428,035 B1 | 8/2002 | Maxwell et al. | |
| 7,004,495 B2 | 2/2006 | Thurm | |
| 7,232,138 B2 * | 6/2007 | Shubert | 280/79.4 |
| 2005/0104324 A1 | 5/2005 | Richard et al. | |

* cited by examiner

*Primary Examiner* — Tony H. Winner
*Assistant Examiner* — Jacob Knutson

(57) ABSTRACT

A towing device for towing an all-terrain vehicle (ATV) behind a vehicle featuring two parallel support bars for cradling rear wheels of the ATV; a first wheel connected to the first ends of the support bars via a first wheel axle connector and a second wheel connected to the second ends of the support bars via second wheel axle connector; eye rings disposed on the support bars adapted to receive ends of straps, the straps being for securing rear wheels of the ATV; an undercarriage bracket pivotally attached to the first support bar for supporting and securing the rear axle of the ATV; and a curved towing arm having a ball hitch tongue for connecting the towing arm to a hitch of the vehicle and two connecting brackets for engaging and securing a front axle of the ATV.

2 Claims, 5 Drawing Sheets

US 8,448,972 B1

TOWING DEVICE FOR AN ALL-TERRAIN VEHICLE

FIELD OF THE INVENTION

The present invention is directed to a device for towing an all-terrain vehicle (ATV) behind an automobile or truck, more particularly to an ATV towing device that can be easily compacted for storage.

BACKGROUND OF THE INVENTION

Transporting all-terrain vehicles (ATVs) often requires large trailer assemblies, which can be large and cumbersome as well as expensive to obtain. The present invention features a towing device for an ATV. The device of the present invention is easy to use and can be compacted for storage purposes.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a towing device for towing an all-terrain vehicle (ATV) behind a vehicle. The towing device comprises a first support bar and a second support bar each having a first end and a second end, the first support bar and the second support bar are positioned generally parallel to each other, the support bars function to cradle a first rear wheel and a second rear wheel of the ATV; a first wheel and a first wheel axle connector, the first wheel axle connector comprises a first connecting bar having a first end and a second end, and a first axle shaft perpendicularly attached to the first connecting bar, wherein the first end of the first support bar is removably attachable to the first end of the first connecting bar, the second end of the first support bar is removably attachable to the second end of the first connecting bar, and the first wheel engages the first axle shaft; and a second wheel and a second wheel axle connector, the second wheel axle connector comprises a second connecting bar having a first end and a second end, and a second axle shaft perpendicularly attached to the first connecting bar, wherein the second end of the first support bar is removably attachable to the first end of the second connecting bar, the second end of the second support bar is removably attachable to the second end of the second connecting bar, and the second wheel engages the second axle shaft.

The towing device further comprises a first eye ring and a second eye ring disposed on the second support bar near the first end and second end, respectively, and a third eye ring and a fourth eye ring disposed on the first support bar near the first end and second end, respectively, the eye rings are adapted to receive an end of a strap, the strap being used to secure the first rear wheel or the second rear wheel of the ATV; an undercarriage bracket pivotally attached to the first support bar, the undercarriage bracket functions to support and secure a rear axle of the ATV, the undercarriage bracket can pivot between an up position wherein the bracket is oriented generally vertically with respect to a ground surface and a down position wherein the undercarriage bracket is oriented generally horizontally with respect to the ground surface; and a curved towing arm having a first end and a second end, wherein a ball hitch tongue for connecting the towing arm to a hitch of the vehicle is disposed on the first end of the towing arm, wherein a first connecting bracket and a second connecting bracket are each disposed on the second end of the towing arm for engaging and securing a front axle of the ATV, and wherein the towing arm is curved to lift the front axle of the ATV such that front wheels of the ATV are raised off the ground surface.

In some embodiments, the first end of the first support bar is removably attachable to the first end of the first connecting bar via a first hinge pin. In some embodiments, the second end of the first support bar is removably attachable to the second end of the first connecting bar via a second hinge pin. In some embodiments, the second end of the first support bar is removably attachable to the first end of the second connecting bar via a third hinge pin. In some embodiments, the second end of the second support bar is removably attachable to the second end of the second connecting bar via fourth hinge pin. In some embodiments, the undercarriage bracket is pivotally attached to the first support bar via a hinge. In some embodiments, the undercarriage bracket is positioned about halfway between the first end and the second end of the first support bar. In some embodiments, the rear axle of the ATV is secured to the undercarriage bracket via a bracket hinge pin.

DESCRIPTION OF PREFERRED EMBODIMENTS

Figure 1:
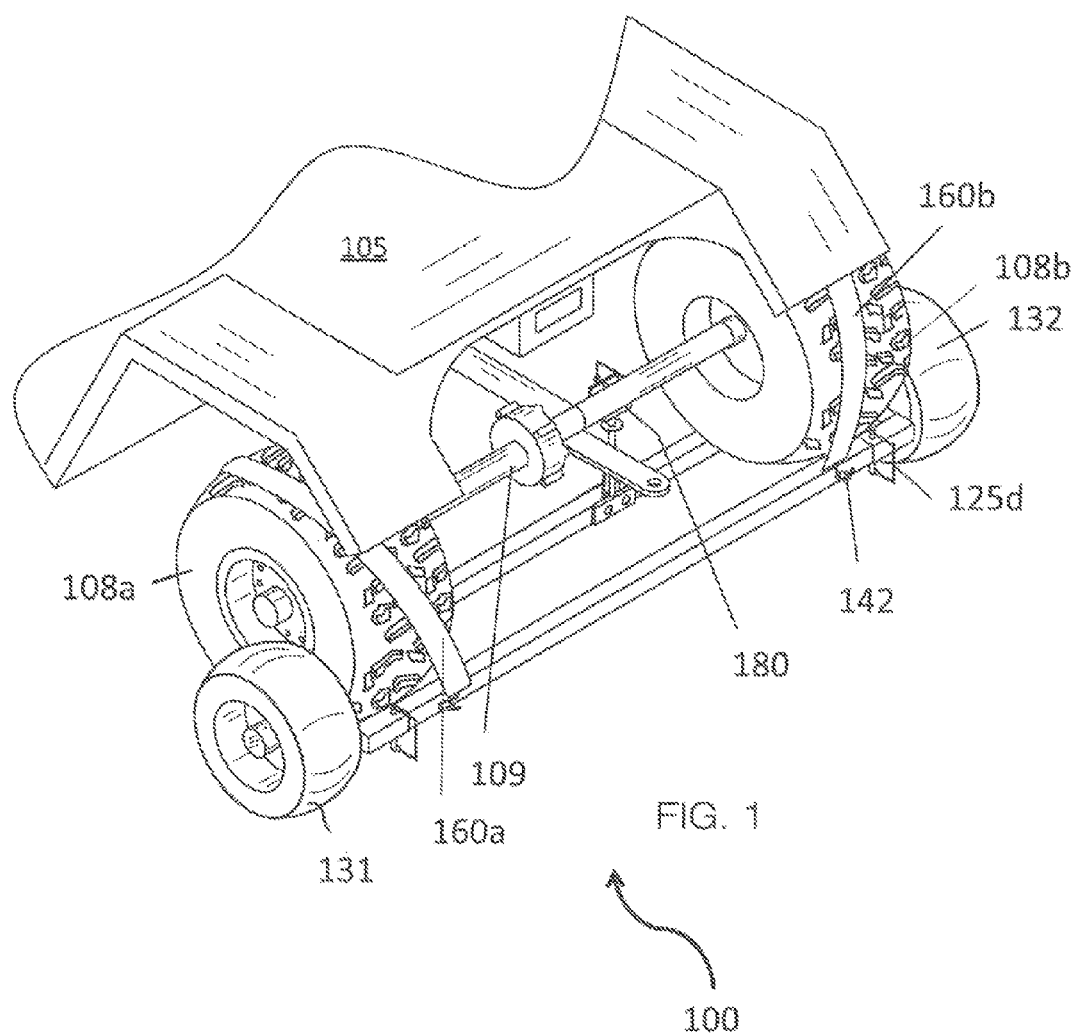
FIG. 1 is a perspective view of the towing device of the present invention.
Figure 2:
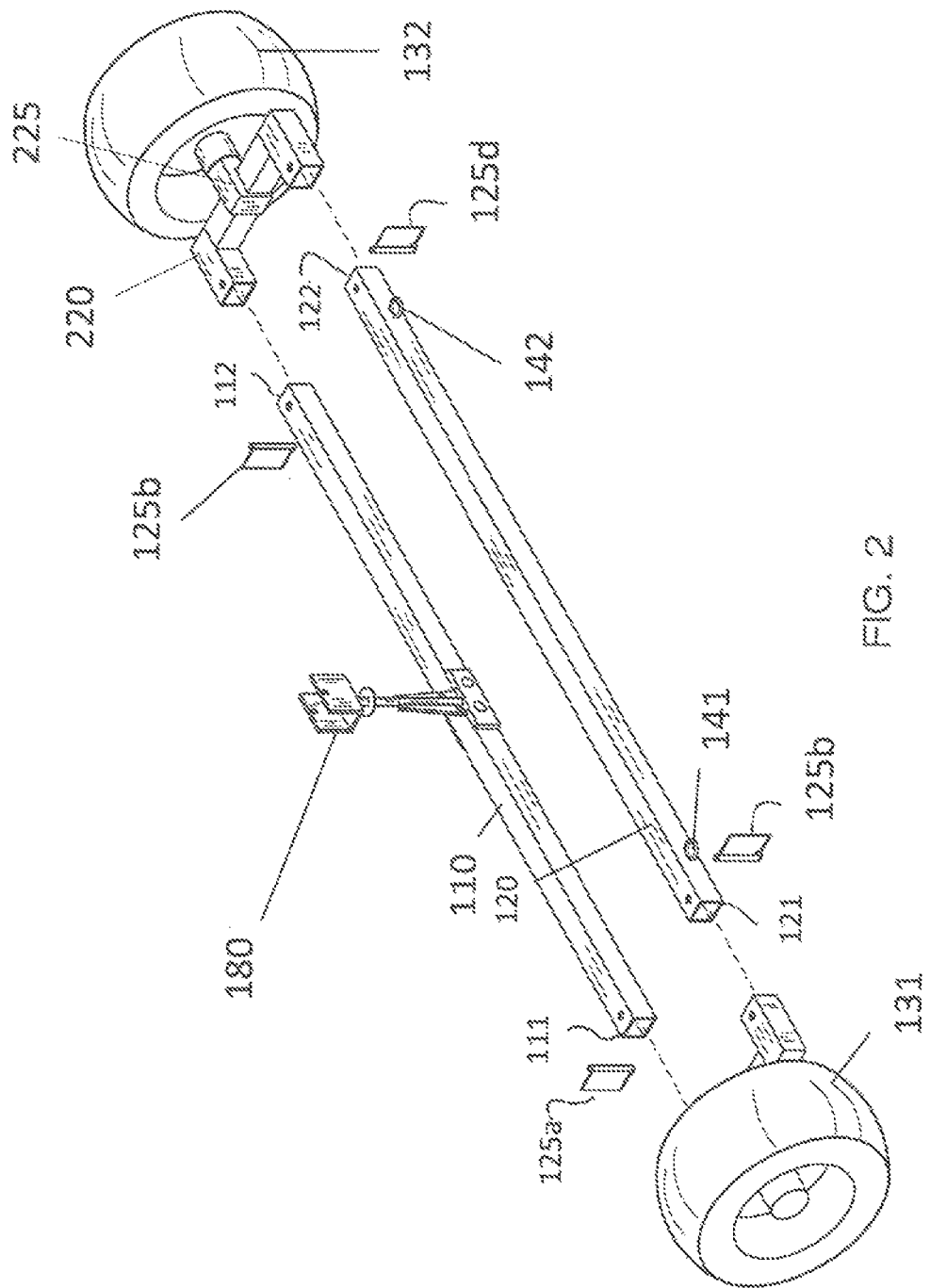
FIG. 2 is a perspective view and exploded view of the towing device of the present invention.
Figure 3:
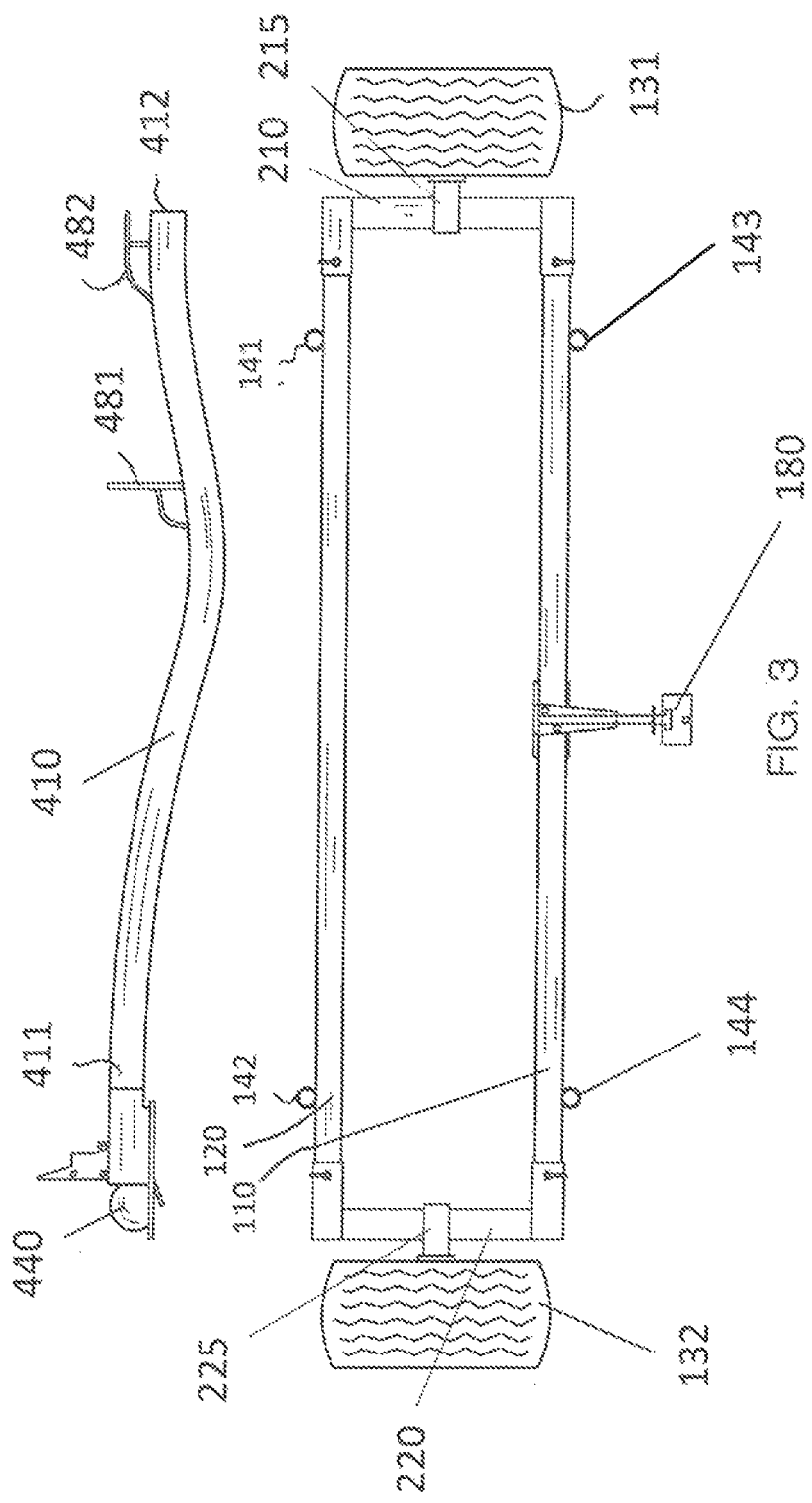
FIG. 3 is a top view of the towing device of the present invention.
Figure 4:
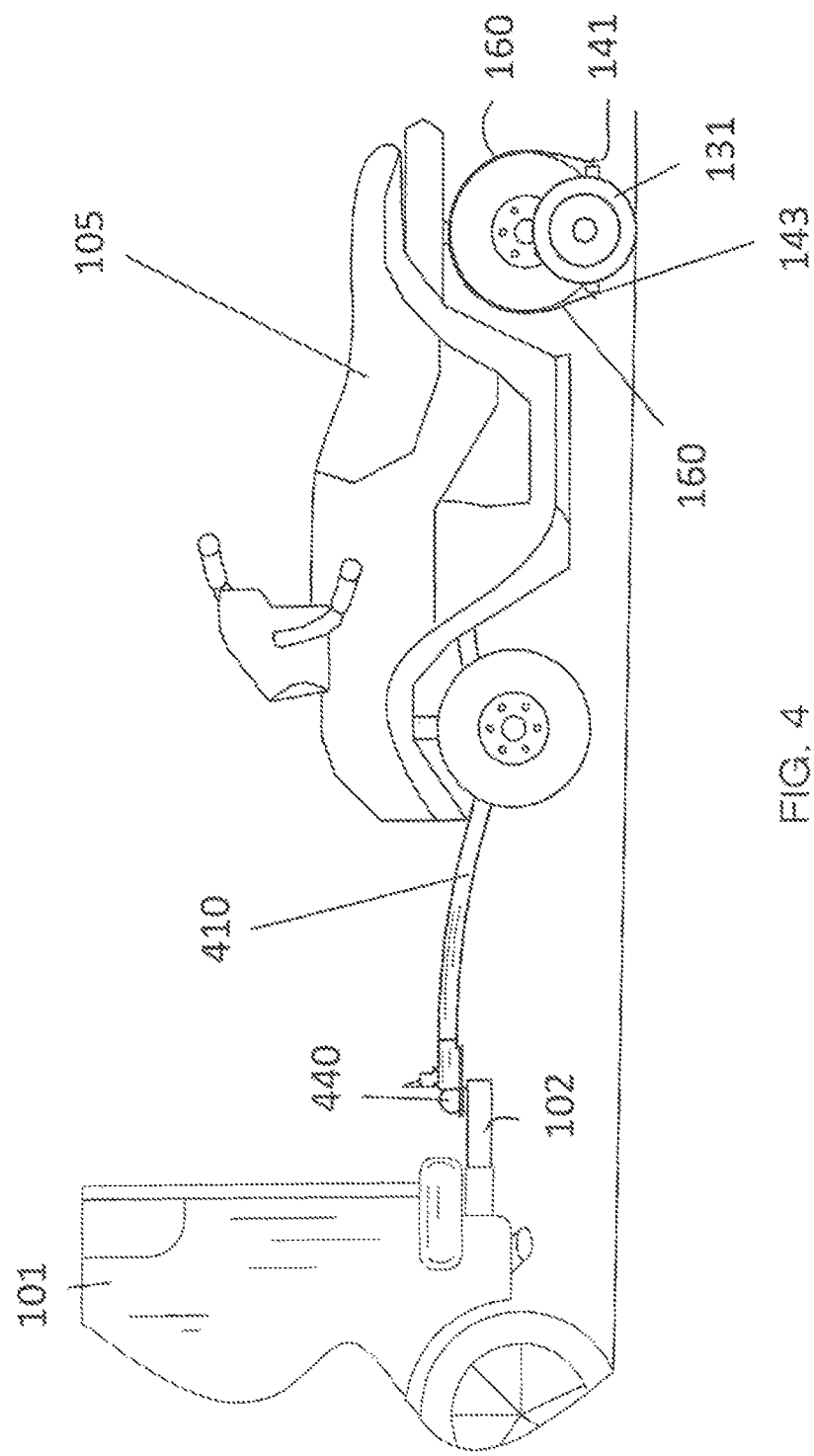
FIG. 4 is a side view of the towing device of the present invention.

Referring now to FIGS. 1-5, the present invention features a towing device 100 for towing an all-terrain vehicle (ATV) 105 behind an automobile or truck 101. The towing device 100 of the present invention can be easily disassembled and stored in a compact manner.

The towing device 100 comprises a first support bar 110 having a first end 111 and a second end 112, and a second support bar 120 having a first end 121 and a second end 122. The first support bar 110 and second support bar 120 are oriented generally parallel to each other and horizontally with respect to the ground surface. The support bars are for supporting or cradling the rear two wheels 108 of the ATV 105.

The first end 111 of the first support bar 110 and the first end 121 of the second support bar 120 are connected to a first wheel 131 via a first wheel axle connector. The first wheel axle connector comprises a first connecting bar 210 having a first end and a second end, wherein the first end 111 of the first support bar 110 attaches to the first end of the first connecting bar 210 (e.g., via a first hinge pin 125*a*) and the first end 121 of the second support bar 120 attaches to the second end of the first connecting bar 210 (e.g., via a second hinge pin 125*b*). The first wheel axle connector further comprises a first axle shaft 215 perpendicularly attached to the first connecting bar 210, wherein the first wheel 131 engages the first axle shaft 215.

The second end 112 of the first support bar 110 and the second end 122 of the second support bar 120 are connected to a second wheel 132 via a second wheel axle connector. The second wheel axle connector comprises a second connecting bar 220 having a first end and a second end, wherein the second end 112 of the first support bar 110 attaches to the first end of the second connecting bar 220 (e.g., via a third hinge pin 125c) and the second end 122 of the second support bar 120 attaches to the second end of the second connecting bar 220 (e.g., via a fourth hinge pin 125d). The second wheel axle connector further comprises a second axle shaft 225 perpendicularly attached to the second connecting bar 220, wherein the second wheel 132 engages the second axle shaft 225.

Disposed on the second support bar 120 near the first end 121 is a first eye ring 141. Disposed on the second support bar 120 near the second end 122 is a second eye ring 142. The eye rings allow a user to wrap a strap 160 around the rear wheel 108 of the ATV or the rear axle 109 of the ATV 105 and secure the strap to the second support bar 120. In some embodiments, a third eye ring 143 and a fourth eye ring 144 are disposed on the first support bar 110 (e.g., near the first end 111 and second end 112, respectively). As shown in FIG. 1, the first end of the first strap 160a is attached to the first support bar 110 (near the first end 111), e.g., via the third eye ring 143, wraps over the first rear wheel 108a, and attaches to the second support bar 120 (near the first end 121), e.g., via the first eye ring 141. The first end of the second strap 160b is attached to the first support bar 110 (near the second end 121), e.g., via the fourth eye ring 144, wraps over the second rear wheel 108b, and attaches to the second support bar 120 (near the second end 122), e.g., via the second eye ring 142.

Pivotally attached to the first support bar 110 (e.g., via a hinge) is an undercarriage bracket 180. In some embodiments, the bracket 180 is disposed about halfway between the first end 111 and the second end 112 of the first support bar 10. The bracket 180 is for supporting the rear axle 109 of the ATV 105 (see FIG. 1). The bracket 180 can move between an up position and a down position. In the up position (see FIG. 2 and FIG. 5), the bracket 180 is oriented vertically with respect to the ground surface. In the down position (see FIG. 3 and FIG. 5), the bracket 180 is oriented horizontally with respect to the ground surface. The bracket 180 is moved to the down position for storage purposes.

Figure 5:
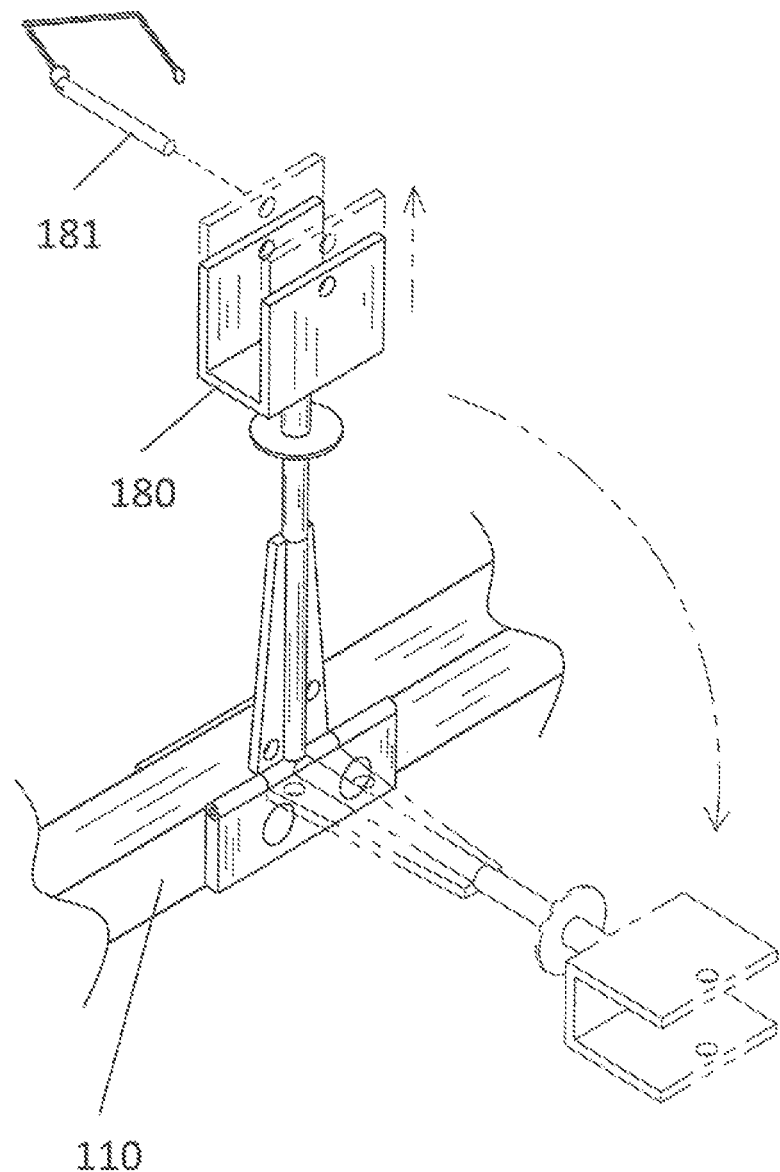
FIG. 5 is a perspective view of the towing device of the present invention.

In some embodiments, the rear axle 109 of the ATV 105 is secured to the undercarriage bracket 180 via a bracket hinge pin 181 (see FIG. 5). The bracket hinge pin 181 can be driven through two aligned bracket apertures disposed in the undercarriage bracket 180. The apertures are adapted to receive the bracket hinge pin 181. Hinge pins and apertures are well known to one of ordinary skill in the art.

The towing device 100 further comprises a curved towing arm 410 having a first end 411 and a second end 412. Disposed on the first end 411 of the towing arm 410 is a ball hitch tongue 440 for connecting the towing arm 410 to a hitch 102 of a vehicle (e.g., a truck 101). Ball hitch tongues and hitches of vehicles are well known to one of ordinary skill in the art. Two connecting brackets are disposed on the second end 412 of the towing arm 410 for engaging and securing to the front axle of the ATV 105. For example, a second connecting bracket 482 is disposed at the second end 412 of the towing arm 410, and a first connecting bracket 481 is disposed on the second end 412 of the towing arm 410 near the second connecting bracket 482 (see FIG. 3). The first connecting bracket 481 and the second connecting bracket 482 together are for engaging and securing to the front axle of the ATV 105.

The towing arm 410 is curved to keep the front axle of the ATV 105 lifted up so that the front wheels of the ATV 105 are off the ground surface.

The following the disclosures of the following U.S. Patents are incorporated in their entirety by reference herein: U.S. Pat. No. 6,428,035; U.S. Pat. No. 4,822,069; U.S. Pat. No. 4,976,449; U.S. Pat. No. 5,906,386; U.S. Pat. No. 7,004,495. U.S. Pat. No. 4,784,402; U.S. Pat. Application No. 2005/0104324.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A towing device for towing an all-terrain vehicle (ATV) behind a vehicle, the towing device comprises:
(a) a first support bar and a second support bar each having a first end and a second end, the first support bar and the second support bar are positioned generally parallel to each other, the support bars function to cradle a first rear wheel and a second rear wheel of the ATV;
a first wheel and a first wheel axle connector, the first wheel axle connector comprises a first connecting bar having a first end and a second end, and a first axle shaft perpendicularly attached to the first connecting bar, wherein the first end of the first support bar is removably attachable to the first end of the first connecting bar, the second end of the first support bar is removably attachable to the second end of the first connecting bar, and the first wheel engages the first axle shaft;
(c) a second wheel and a second wheel axle connector, the second wheel axle connector comprises a second connecting bar having a first end and a second end, and a second axle shaft perpendicularly attached to the first connecting bar, wherein the second end of the first support bar is removably attachable to the first end of the second connecting bar, the second end of the second support bar is removably attachable to the second end of the second connecting bar, and the second wheel engages the second axle shaft;
(d) a first eye ring and a second eye ring disposed on the second support bar near the first end and second end, respectively, and a third eye ring and a fourth eye ring disposed on the first support bar near the first end and second end, respectively, the eye rings are adapted to receive an end of a strap, the strap being used to secure the first rear wheel or the second rear wheel of the ATV;
(e) an undercarriage bracket pivotally attached to the first support bar, the undercarriage bracket functions to support and secure a rear axle of the ATV, the undercarriage bracket can pivot between an up position wherein the bracket is oriented generally vertically with respect to a ground surface and a down position wherein the undercarriage bracket is oriented generally horizontally with respect to the ground surface, wherein the undercarriage bracket is positioned about halfway between the first end and the second end of the first support bar; and
(f) a curved towing arm having a first end and a second end, wherein a ball hitch tongue for connecting the towing arm to a hitch of the vehicle is disposed on the first end of the towing arm, wherein a first connecting bracket and a second connecting bracket are each disposed on the second end of the towing arm for engaging and securing a front axle of the ATV, and wherein the towing arm is curved to lift the front axle of the ATV such that front wheels of the ATV are raised off the ground surface.

2. A towing device for towing an all-terrain vehicle (ATV) behind a vehicle, the towing device comprises:

(a) a first support bar and a second support bar each having a first end and a second end, the first support bar and the second support bar are positioned generally parallel to each other, the support bars function to cradle a first rear wheel and a second rear wheel of the ATV;

(b) a first wheel and a first wheel axle connector, the first wheel axle connector comprises a first connecting bar having a first end and a second end, and a first axle shaft perpendicularly attached to the first connecting bar, wherein the first end of the first support bar is removably attachable to the first end of the first connecting bar, the second end of the first support bar is removably attachable to the second end of the first connecting bar, and the first wheel engages the first axle shaft;

(c) a second wheel and a second wheel axle connector, the second wheel axle connector comprises a second connecting bar having a first end and a second end, and a second axle shaft perpendicularly attached to the first connecting bar, wherein the second end of the first support bar is removably attachable to the first end of the second connecting bar, the second end of the second support bar is removably attachable to the second end of the second connecting bar, and the second wheel engages the second axle shaft;

(d) a first eye ring and a second eye ring disposed on the second support bar near the first end and second end, respectively, and a third eye ring and a fourth eye ring disposed on the first support bar near the first end and second end, respectively, the eye rings are adapted to receive an end of a strap, the strap being used to secure the first rear wheel or the second rear wheel of the ATV;

(e) an undercarriage bracket pivotally attached to the first support bar, the undercarriage bracket functions to support and secure a rear axle of the ATV, the undercarriage bracket can pivot between an up position wherein the bracket is oriented generally vertically with respect to a ground surface and a down position wherein the undercarriage bracket is oriented generally horizontally with respect to the ground surface, the rear axle of the ATV is secured to the undercarriage bracket via a bracket hinge pin; and (f) a curved towing arm having a first end and a second end, wherein a ball hitch tongue for connecting the towing arm to a hitch of the vehicle is disposed on the first end of the towing arm, wherein a first connecting bracket and a second connecting bracket are each disposed on the second end of the towing arm for engaging and securing a front axle of the ATV, and wherein the towing arm is curved to lift the front axle of the ATV such that front wheels of the ATV are raised off the ground surface.

\* \* \* \* \*